US012650635B2

(12) United States Patent
Kim et al.

(10) Patent No.: US 12,650,635 B2
(45) Date of Patent: Jun. 9, 2026

(54) CAMERA MODULE WITH REFLECTION MODULE

(71) Applicant: SAMSUNG ELECTRO-MECHANICS CO., LTD., Suwon-si (KR)

(72) Inventors: Yoo Chang Kim, Suwon-si (KR); Young Suk Kang, Suwon-si (KR); Tae Yeon Lim, Suwon-si (KR); Gil Hun Lee, Suwon-si (KR); Seong Jin Choi, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 309 days.

(21) Appl. No.: 18/466,252

(22) Filed: Sep. 13, 2023

(65) Prior Publication Data

US 2024/0337910 A1 Oct. 10, 2024

(30) Foreign Application Priority Data

Apr. 10, 2023 (KR) ......................... 10-2023-0047076

(51) Int. Cl.
*G03B 17/17* (2021.01)
*G03B 5/00* (2021.01)

(52) U.S. Cl.
CPC .............. *G03B 17/17* (2013.01); *G03B 5/00* (2013.01)

(58) Field of Classification Search
CPC .......... G03B 17/17; G03B 17/12; G03B 5/00; G03B 5/02; G03B 5/06; G03B 5/08
See application file for complete search history.

(56) References Cited

U.S. PATENT DOCUMENTS

| | | | |
|---|---|---|---|
| 2007/0035631 A1 | 2/2007 | Ueda | |
| 2016/0202455 A1 | 7/2016 | Aschwanden et al. | |
| 2021/0286193 A1* | 9/2021 | Kwon | G02B 13/02 |
| 2022/0397807 A1* | 12/2022 | Chang | G03B 17/17 |
| 2023/0100382 A1* | 3/2023 | Sharma | G03B 17/17 |
| | | | 348/373 |
| 2024/0241353 A1* | 7/2024 | Tung | G02B 13/0065 |

FOREIGN PATENT DOCUMENTS

| | | |
|---|---|---|
| JP | 2007-47547 A | 2/2007 |
| KR | 10-2016-0115956 A | 10/2016 |
| KR | 10-2019-0022522 A | 3/2019 |
| KR | 10-2022-0058508 A | 5/2022 |
| KR | 10-2022-0143174 A | 10/2022 |
| WO | WO 2015/134174 A1 | 9/2015 |
| WO | WO 2019/008517 A1 | 1/2019 |

OTHER PUBLICATIONS

Korean Office Action issued on Jan. 2, 2025 in corresponding Korean Patent Application No. 10-2023-0047076. (6 pages in English and 5 pages in Korean).

* cited by examiner

*Primary Examiner* — Alexander P Gross
(74) *Attorney, Agent, or Firm* — NSIP Law

(57) ABSTRACT

A camera module is provided. The camera module includes a first lens module including at least one lens and having light incident thereinto, a second lens module including at least one lens, and a reflection module having a reflective member configured to guide light that has passed through the first lens module to the second lens module, and perform an optical image stabilization operation. A light blocking member is disposed between the first lens module and the reflection module, and the first lens module is coupled to the reflection module and is configured to move together with the reflection module.

19 Claims, 13 Drawing Sheets

100

CAMERA MODULE WITH REFLECTION MODULE

CROSS-REFERENCE TO RELATED APPLICATIONS

This application claims the benefit under 35 USC § 119 (a) of Korean Patent Application No. 10-2023-0047076, filed on Apr. 10, 2023, in the Korean Intellectual Property Office, the entire disclosure of which is incorporated herein by reference for all purposes.

BACKGROUND

1. Field

The following description relates to a camera module with a reflection module.

2. Description of Related Art

A camera module disposed in a mobile device may be manufactured to have performance comparable to the performance of a typical camera. Specifically, as the frequency of capturing images using a mobile device increases, the desire for a camera module that is configured to provide a high zoom magnification increases.

The camera module may adjust the zoom magnification by moving the lens module. To configure a high zoom magnification, a distance that light incident on the camera travels to the image sensor should be secured, for example, a full length or a total track length (TTL). To implement a long total track length, the overall length of the camera may be increased. However, as mobile devices are gradually being miniaturized, there may be space constraints in increasing a sufficiently long length of the camera module.

Therefore, a structure in which an optical path may be formed to be as long as possible is desired without increasing the overall length of the camera module or while reducing the overall length of the camera module.

Additionally, a recent camera module may include a movable or rotatable reflector to refract or reflect light to lengthen an optical path and perform an optical image stabilization operation.

However, there is a problem in that flare may occur when light is introduced through a gap between a reflector that performs an image stabilization operation and a surrounding structure.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a camera module includes a first lens module comprising at least one lens, and having light incident thereinto; a second lens module comprising at least one lens; and a reflection module having a reflective member configured to guide light that has passed through the first lens module to the second lens module, and perform an optical image stabilization operation, wherein a light blocking member is disposed between the first lens module and the reflection module, and wherein the first lens module is coupled to the reflection module, and is configured to move together with the reflection module.

The light blocking member may have a larger area than an area of the reflective member and a lens disposed in the first lens module, closest to the reflective member.

The light blocking member may be a spacer disposed between the reflective member and a lens disposed in the first lens module closest to the reflective member.

The spacer may be one of a plastic film and a black coated stainless-steel material.

The light blocking member may be fixedly coupled to the reflection module.

The light blocking member may be integrally disposed with the reflection module.

The light blocking member may be fixedly coupled to the first lens module.

The light blocking member may be integrally disposed with the first lens module.

The light blocking member may include an opening through which light passes, and at least a portion of an edge of the light blocking member adjacent to the opening has a serrated shape.

The reflection module may be configured to be rotatable about a first axis perpendicular to an optical axis of the second lens module and a second axis, perpendicular to both the optical axis and the first axis.

An electronic device may include the camera module.

In a general aspect, a camera module includes a first lens module having a first optical axis and a second lens module having a second optical axis different from the first optical axis; and a reflection module including a reflective member configured to guide light that has passed through the first lens module to the second lens module, and disposed between the first lens module and the second lens module, wherein a light blocking member is disposed between the first lens module and the reflection module, wherein a relative alignment of the first lens module and the reflection module is maintained to be constant, and wherein a relative alignment of the second lens module and the reflection module is configured to be changeable.

The first lens module may be fixedly coupled to the reflection module.

The light blocking member may have a larger area than a surface of the reflective member opposite to the light blocking member.

The light blocking member may have a larger area than an area of an effective surface of a lens disposed closest to the reflective member among lenses disposed in the first lens module.

The light blocking member may include an opening through which light passes, and at least a portion of an edge of the light blocking member adjacent to the opening has a serrated shape.

An electronic device may include the camera module.

In a general aspect, a camera module includes a prism; a light blocking member disposed on a light incident surface of the prism; a first lens module disposed on a light incident surface of the light blocking member; a reflection module disposed on the light incident surface of the prism; wherein the light blocking member comprises a serrated inner edge, and wherein the prism is configured to direct light incident on the first lens module to a second lens module.

The first lens module may be coupled to the reflection module and is configured to move together with the reflection module.

Other features and aspects will be apparent from the following detailed description, the drawings, and the claims.

Figure 1:
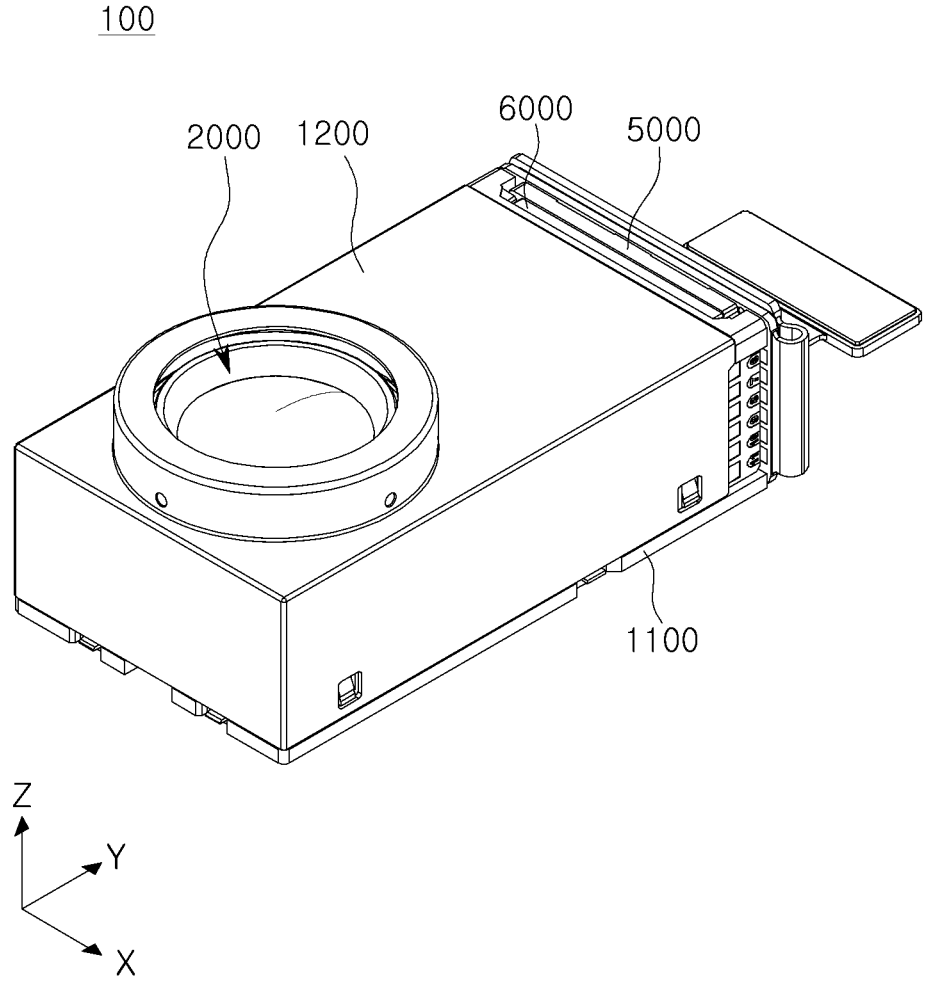
FIG. 1 illustrates a combined perspective view of an example camera module, in accordance with one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto. The use of the terms "example" or "embodiment" herein have a same meaning, e.g., the phrasing "in one example" has a same meaning as "in one embodiment", and "one or more examples" has a same meaning as "in one or more embodiments."

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

In addition, in the following description, expressions such as upper side, upper portion, lower side, lower portion, side surface, front, rear, etc. are expressed based on the direction illustrated in the drawings, and may be expressed differently if the direction of the object is changed.

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

One or more examples provide a camera module which has a high zoom magnification without increasing an overall length.

One or more examples provide a reflection module and a camera module having a structure in which light introduced through a gap between a reflector (a reflective member) and a surrounding structure may be significantly blocked.

Figure 2:
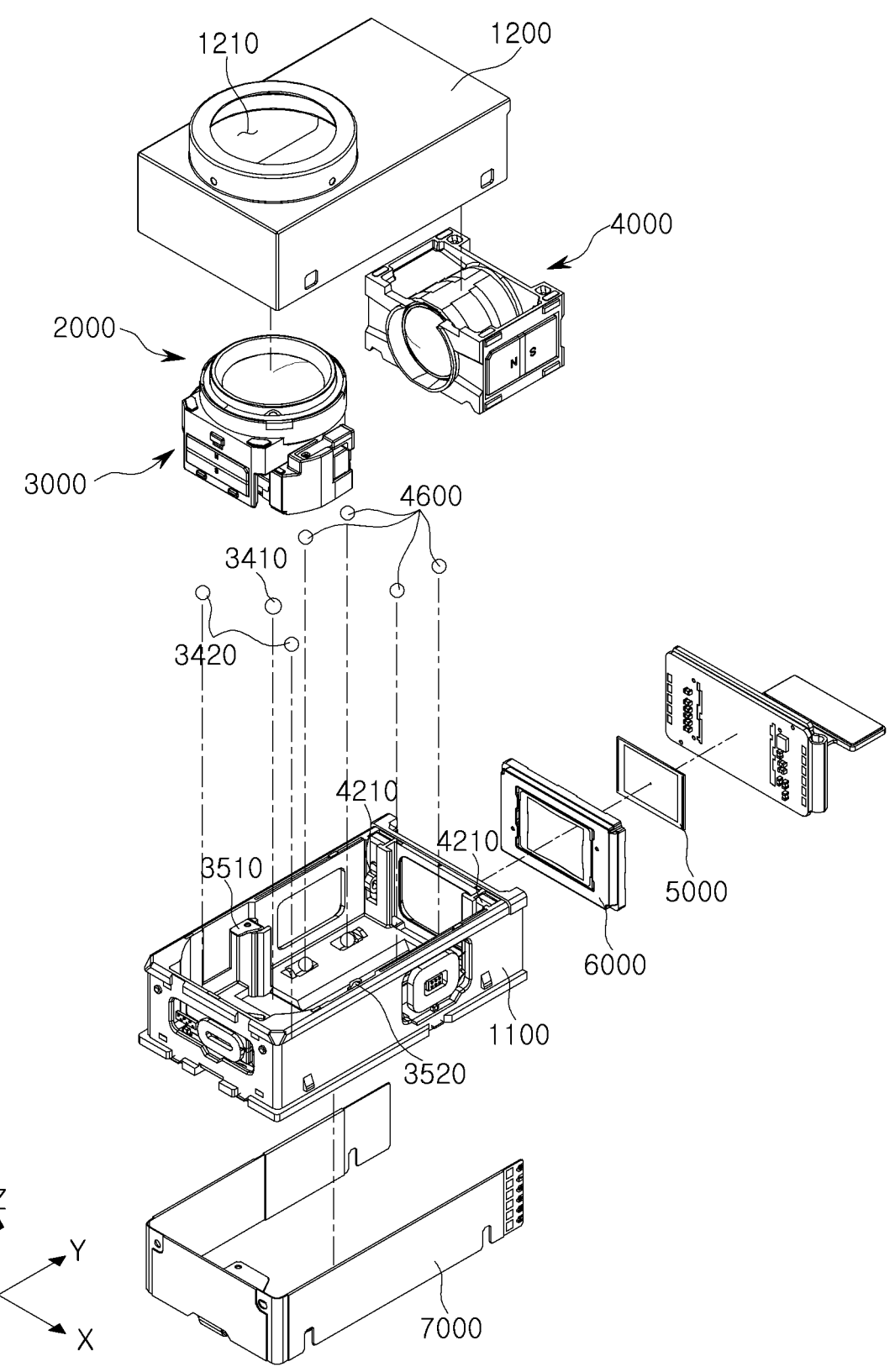
FIG. 2 illustrates an exploded perspective view of an example camera module, in accordance with one or more embodiments.
Figure 3:
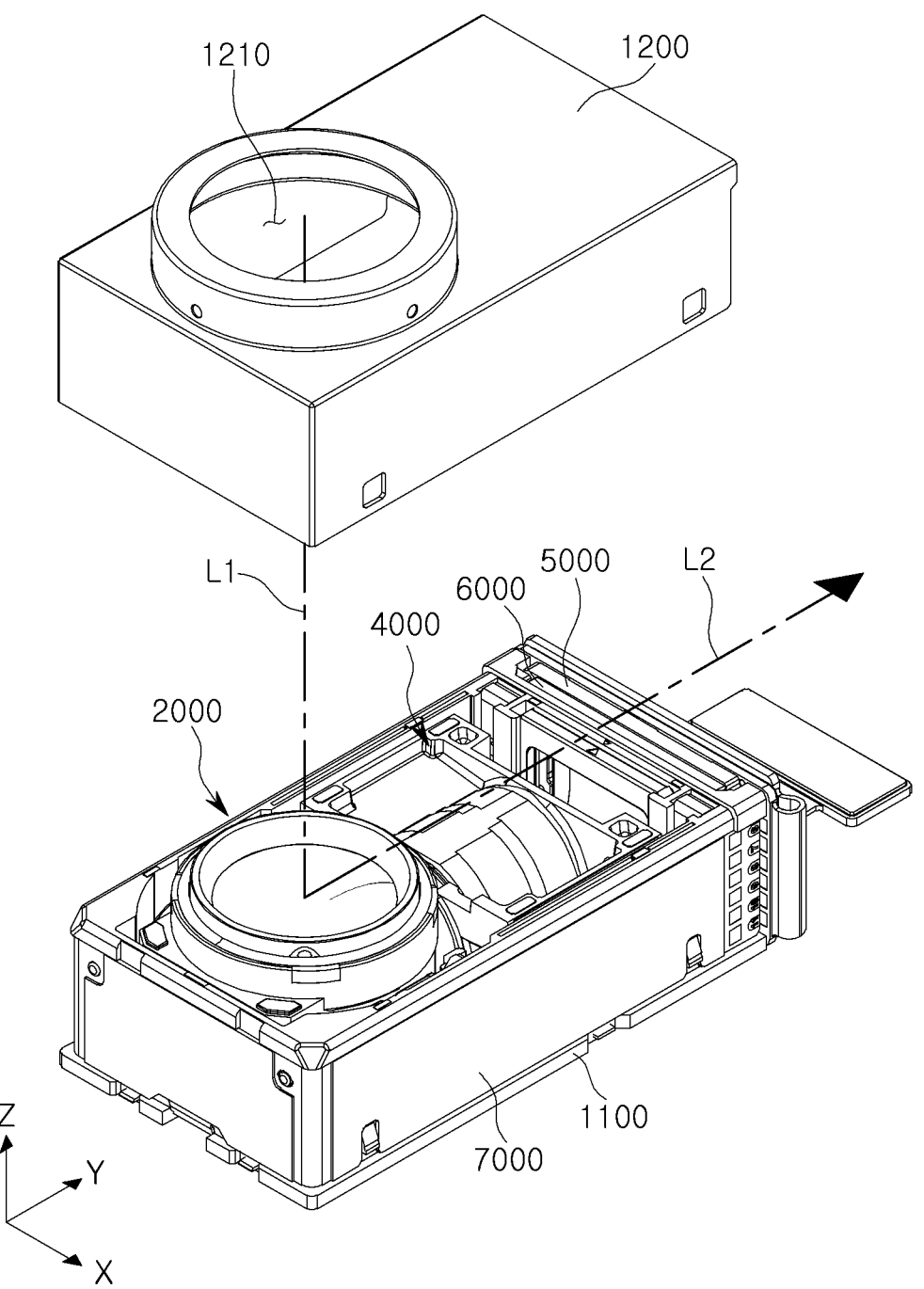
FIG. 3 illustrates a partial perspective view of a disposition relationship among a first lens module, a reflection module, and a second lens module, in accordance with one or more embodiments.

FIG. 1 illustrates a combined perspective view of an example camera module, in accordance with one or more embodiments, FIG. 2 illustrates an exploded perspective view of an example camera module, in accordance with one or more embodiments, and FIG. 3 illustrates a partial perspective view of the arrangement relationship of a first lens module, a reflection module, and a second lens module, in accordance with one or more embodiments.

Referring to FIGS. 1 to 3, an example camera module 100, in accordance with one or more embodiments, may include a housing 1100, a reflection module 3000, a plurality of lens modules 2000 and 4000, and an image sensor 5000.

The camera module 100, in accordance with one or more embodiments, may include the plurality of lens modules 2000 and 4000. The plurality of lens modules 2000 and 4000 may include a first lens module 2000 and a second lens module 4000 having different optical axes. Light incident from an external subject to the camera module 100 may be incident to the image sensor 5000 via the first lens module 2000 and the second lens module 4000.

An optical axis L1 of the first lens module 2000 and an optical axis L2 of the second lens module 4000 may not be parallel to each other. For example, the first lens module 2000 and the second lens module 4000 may be disposed such that the first optical axis L1 and the second optical axis L2 intersect. The first optical axis L1 and the second optical axis L2 may be substantially perpendicular to each other, but are not limited thereto.

Lenses included in the first lens module 2000 or the second lens module 4000 may be configured to be relatively movable with respect to the image sensor 5000. For example, lenses 2100 included in the first lens module 2000 may rotate together with a reflective member 3100. Alternatively, lenses included in the second lens module 4000 may be configured to move along the second optical axis L2. As the lenses included in the respectively lens modules 2000 and 4000 move, an Optical Image Stabilization (OIS) operation or an auto focus (AF) operation of the camera module 100 may be performed.

In the camera module 100 according to an embodiment, the reflection module 3000 that changes a traveling direction of light emitted from the first lens module 2000 in a direction parallel to the second optical axis L2 may be disposed between the first lens module 2000 and the second lens module 4000. In an example, referring to FIG. 2, the reflection module 3000 that changes a propagation path of light may be disposed between the first lens module 2000 and the second lens module 4000. In an example, the camera module 100 may include the reflection module 3000 disposed on an optical path from the first lens module 2000 to the second lens module 4000.

The reflection module 3000 may be accommodated in the inner space of the housing 1100, and may change the path of light incident to the reflection module 3000. In this example, the reflection module 3000 will be understood as a concept including at least a portion of the reflective member 3100 that changes a path of light, components supporting and driving the reflective member 3100, and the housing 1100 accommodating the same.

The reflective member 3100 of the reflection module 3000 is configured to change the traveling path of light by refracting or reflecting light, and for example, may be a prism or a mirror that changes an optical path by refracting or reflecting light.

The reflective member 3100 may change the traveling path of light emitted from the first lens module 2000 toward the second lens module 4000. In an example, the reflective member 3100 may change a traveling path of light incident along the first optical axis L1 to a direction substantially parallel to the second optical axis L2. Accordingly, as illustrated in FIG. 3, the traveling path of incident light L1 incident from the outside of the camera module 100 to the first lens module 2000 may be changed while passing through the reflection module 3000 and may be incident (L2) to the second lens module 4000. The incident light L1 may be properly refracted while passing through the second lens module 4000 and may be incident to the image sensor 5000.

The reflective member 3100 may be configured to be rotatable or movable within the housing 1100. According to the rotation or movement of the reflective member 3100, the path of the light L may be appropriately changed. The camera module 100 may perform an optical image stabilization (OIS) operation by rotating or moving the reflective member 3100.

The reflective member 3100 may have a plurality of rotational axes, and may be configured to be rotatable in different directions. In an example, the reflective member 3100 may rotate about a first rotation axis parallel to the first optical axis L1. Alternatively, the reflective member 3100 may rotate about a second rotation axis perpendicular to both the first optical axis L1 and the second optical axis L2. Due to this rotation, the reflective member 3100 may change the traveling path of light to be substantially parallel to the second optical axis L2.

Figure 4:
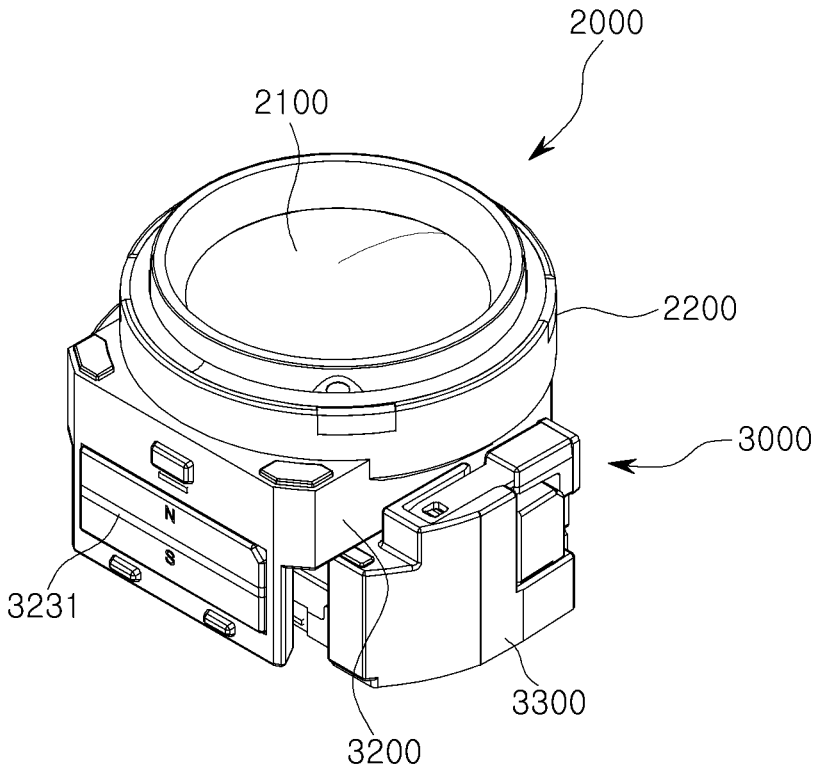
FIG. 4 illustrates a combined perspective view of a combined shape of a first lens module and a reflection module, in accordance with one or more embodiments.
Figure 5:
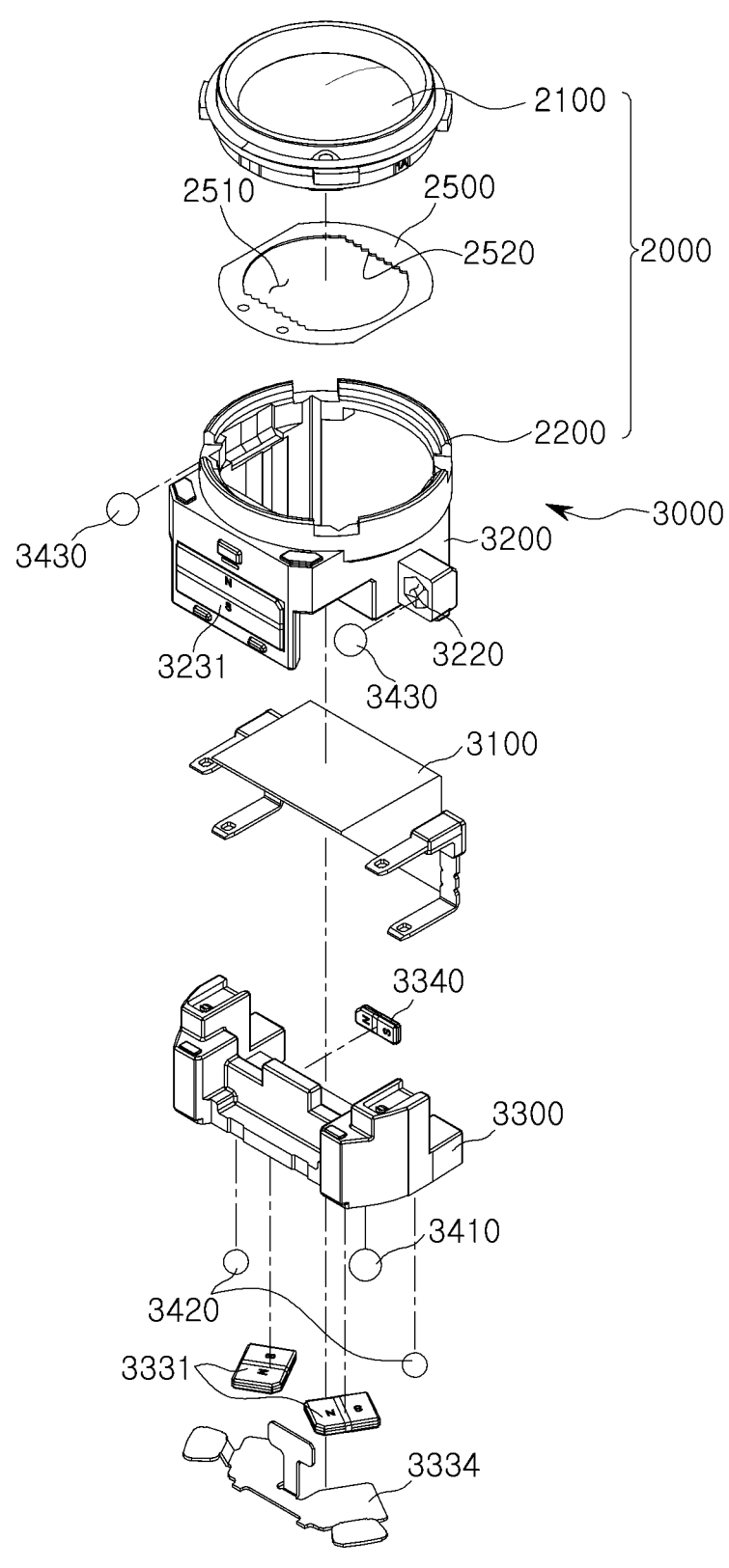
FIG. 5 illustrates an exploded perspective view of a first lens module and a reflection module, in accordance with one or more embodiments.

In this example, referring to FIGS. 4 and 5, the first lens module 2000 and the reflection module 3000 may have a mutually coupled structure. In an example, the first lens module 2000 includes a first lens holder 2200 and lenses provided therein, and the reflection module 3000 may include a reflective holder 3200 and the reflective member 3100. The first lens holder 2200 and the reflective holder 3200 may be mutually coupled or integrally provided. Accordingly, the first lens holder 2200 may be moved (rotated) together when the reflective holder 3200 moves for optical image stabilization driving. Specifically, the first lens module 2000 may be coupled to (or integrally provided with) the reflection module 3000, and may move together therewith.

Accordingly, the relative alignment of the first lens module 2000 and the reflection module 3000 may be maintained to be constant, and the relative alignment state of the second lens module 4000 and the reflection module 3000 may be variably provided. In an example, since the first lens module 2000 is coupled to or integrally provided with the reflection module 3000 and may be driven together with the reflection module 3000, there may be no relative movement therebetween. However, since the second lens module 4000 is provided separately and may be driven in the direction of the second optical axis L2, the first lens module 2000 may be moved relative to the second lens module 4000 such that the relative alignment state may be changed.

On the other hand, a light blocking member 2500 may be provided between the first lens module 2000 and the reflection module 3000. In a non-limited example, the light blocking member 2500 may be larger than the reflective member 3100 and the lens 2100 provided in the first lens module 2000, closest to the reflective member 3100. Additionally, in a non-limited example, the light blocking member 2500 may have a larger area with regard to a plane perpendicular to the first optical axis L1 than the surface of the reflective member 3100 opposite thereto. Specifically, the light blocking member 2500 may have a larger area of a plane perpendicular to the first optical axis L1 than the effective surface of a lens provided closest to the reflective member 3100 among the lenses provided in the first lens module 2000.

Additionally, the light blocking member 2500 may be a spacer provided between the reflective member 3100 and the lens 2100 of the first lens module 2000, closest to the reflective member 3100. The spacer may be a plastic film or a black-coated stainless-steel material.

The light blocking member 2500 includes an opening 2510 through which light passes, and at least a portion of an edge of the opening 2510 may have a serration, or serrated, shape (2520).

Referring to FIG. 5, in an example, the light blocking member 2500 may be provided as a separate member from the first lens module 2000, for example, the first lens holder

2200 or the reflection module 3000, for example, the reflective holder 3200. In a non-limited example, the light blocking member 2500 may be fixedly coupled to the first lens holder 2200 or the reflective holder 3200.

Figure 6:
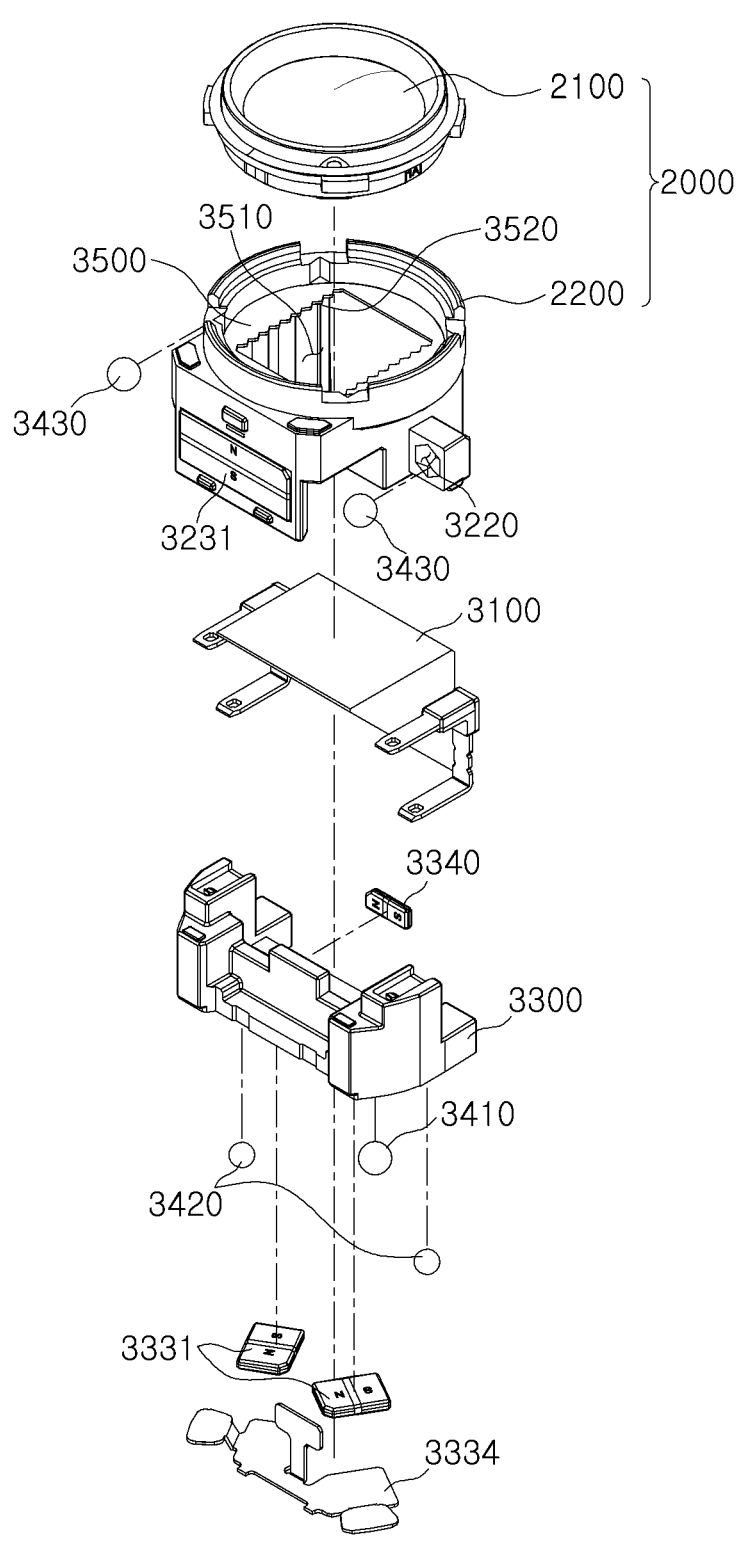
FIG. 6 illustrates an exploded perspective view of a first lens module and a reflection module, in accordance with one or more embodiments.

Referring to FIG. 6, a structure provided with a light blocking member 3500, in accordance with one or more embodiments, is provided. This embodiment is different only between the structures of the light blocking member 3500 and the light blocking member 2500 according to the embodiment described with reference to FIG. 5, and all other structures are the same as the structures according to the embodiment described with reference to FIG. 5, and thus, a detailed description thereof will be omitted.

The light blocking member 3500 may be provided between the first lens module 2000 and the reflection module 3000. The light blocking member 3500 may be larger than the reflective member 3100 and the lens 2100 provided in the first lens module 2000, closest to the reflective member 3100. Additionally, the light blocking member 3500 may have a larger area of a plane perpendicular to the first optical axis L1 than the surface of the reflective member 3100 opposite thereto. Specifically, the light blocking member 3500 may have a larger area of a plane perpendicular to the first optical axis L1 than the effective surface of the lens provided closest to the reflective member 3100 among the lenses provided in the first lens module 2000.

Additionally, the light blocking member 3500 may be a plastic film or a black-coated stainless-steel material provided between the reflective member 3100 and the lens 2100 of the first lens module 2000 closest to the reflective member 3100.

The light blocking member 3500 includes an opening 3510 through which light passes, and at least a portion of an edge of the opening 3510 may have a serration, or serrated, shape 3520.

The light blocking member 3500 may be integrally provided with the first lens module 2000, for example, the first lens holder 2200 or with the reflection module 3000, for example, the reflective holder 3200. In an example, the light blocking member 2500 may have a structure integrally coupled to the first lens holder 2200 or the reflective holder 3200.

In the following description, the first rotation axis may be simply referred to as a 'first axis' and the second rotation axis may be briefly referred to as a 'second axis'. In an example, unless otherwise indicated as 'optical axis', 'first axis and second axis' may be understood as 'first rotation axis and second rotation axis' of the reflection module 3000.

Additionally, an axis perpendicular to both the first rotation axis and the second rotation axis is defined as a 'third axis'. In an example, the second optical axis L2 may be substantially parallel to the third axis.

The camera module 100 may include an image sensor 5000 into which light having passed through the reflection module 3000 and the plurality of lens modules 2000 and 4000 is incident. The image sensor 5000 may convert incident light into image information. The image sensor 5000 may be disposed such that the light collection surface faces the exit surface of the second lens module 4000, and may generate an electrical signal corresponding to light incident from the second lens module 4000.

The image sensor 5000 may be accommodated inside the housing 1100, or may be disposed outside of the housing 1100.

A filter unit 6000, that filters at least a portion of light incident from the lens module 4000, may be disposed in front of the image sensor 5000. The filter unit 6000 may include an optical filter (e.g., an infrared cut filter) that is configured to block light of a specific wavelength. Alternatively, the filter unit 6000 may include a baffle that blocks at least a portion of light incident from the lens module.

Although not illustrated, to configure a relatively longer path of light, the camera module 100 may further include another reflection module disposed between the lens module and the image sensor 5000 to change the path of light.

The housing 1100, in accordance with one or more embodiments, may have an internal space in which at least one of the reflection module 3000, the plurality of lens modules 2000 and 4000, or the image sensor 5000 may be accommodated. The housing 1100 may be formed of a material having a predetermined rigidity to protect components accommodated therein. In an example, the housing 1100 may be a box-shaped member with an open top. However, the material and shape of the housing 1100 are not limited thereto.

The camera module 100 may include a shield can 1200 that covers an upper portion of the housing 1100. The shield can 1200 may cover the open top of the housing 1100 to protect components inside the housing 1100 from an external environment.

The shield can 1200 may include an opening 1210 through which incident light passes.

The first lens module 2000 and the second lens module 4000 may have optical axes L1 and L2 intersecting each other. The reflection module 3000 may be disposed between the first lens module 2000 and the second lens module 4000, and may change a path of light traveling in the direction of the first optical axis L1 to a direction of the second optical axis L2. As the plurality of lens modules 2000 and 4000 are disposed to have optical axes intersecting each other, the overall length of the camera module 100 may be reduced, as compared to the example in which the plurality of lens modules 2000 and 4000 are disposed side by side along the same optical axis.

In this embodiment, the second lens module 4000 and the reflection module 3000 may be housed in one housing 1100. However, this is only an example. In another embodiment, the respective lens modules 2000 and 4000 and the reflection module 3000 may be accommodated in a plurality of housings, respectively, and may be provided as different parts, and may be assembled together to form the overall camera module 100. The image sensor 5000 may also be provided in a housing separate from the housing of the reflection module 3000 or the lens modules 2000 and 4000. In this example, the individual parts may be defined as a lens module assembly, a reflection module assembly, and an image sensor assembly, respectively. For example, the camera module 100 may include a reflection module assembly including the reflection module 3000, a lens module assembly including one or more lens modules 2000 and 4000, and an image sensor assembly.

In this embodiment, the first lens module 2000 may include one or more lenses 2100 disposed along the first optical axis L1, and a first lens holder 2200 that accommodates the lenses 2100. Light introduced from an external subject may be refracted by the lens 2100 of the first lens module 2000, and may then be incident to the reflection module 3000.

In the camera module 100 of this embodiment, the first lens module 2000 may be disposed in front of the reflection module 3000. An exit surface of the lens 2100 included in the first lens module 2000 may be disposed in a direction toward the reflective member 3100. Accordingly, the first lens module 2000 may emit light received from an external subject to the reflection module 3000.

The first lens module 2000 may be disposed such that the first optical axis L1 passes through the reflective member 3100 of the reflection module 3000.

The first lens module 2000 may be coupled to the reflection module 3000 or integrally provided with each other.

Figure 7:
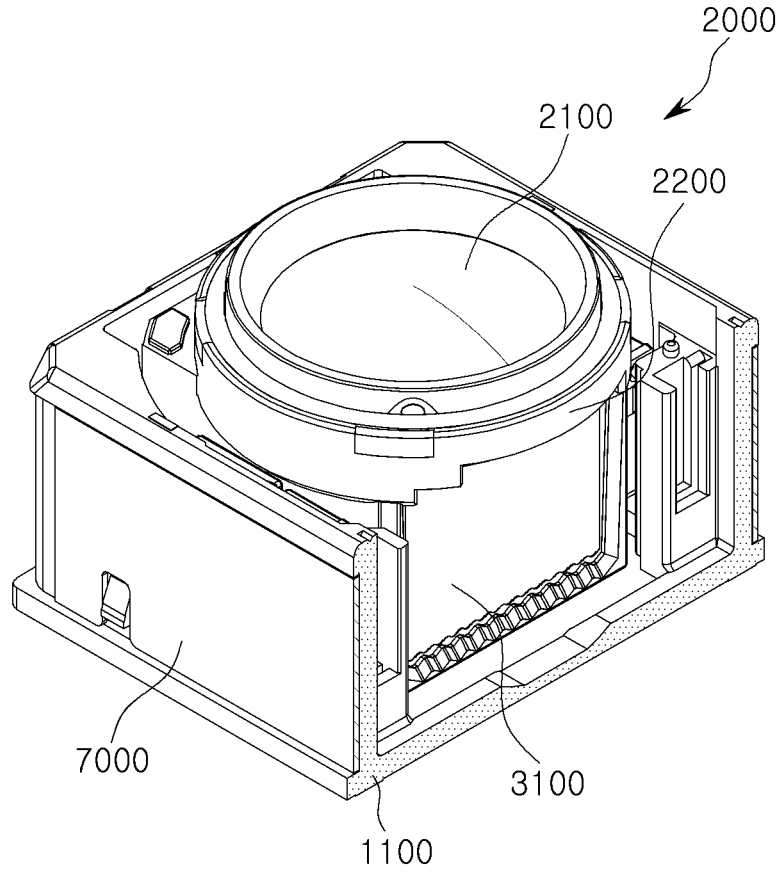
FIG. 7 illustrates a perspective view of a first lens module and a reflection module coupled to a housing, in accordance with one or more embodiments.
Figure 8:
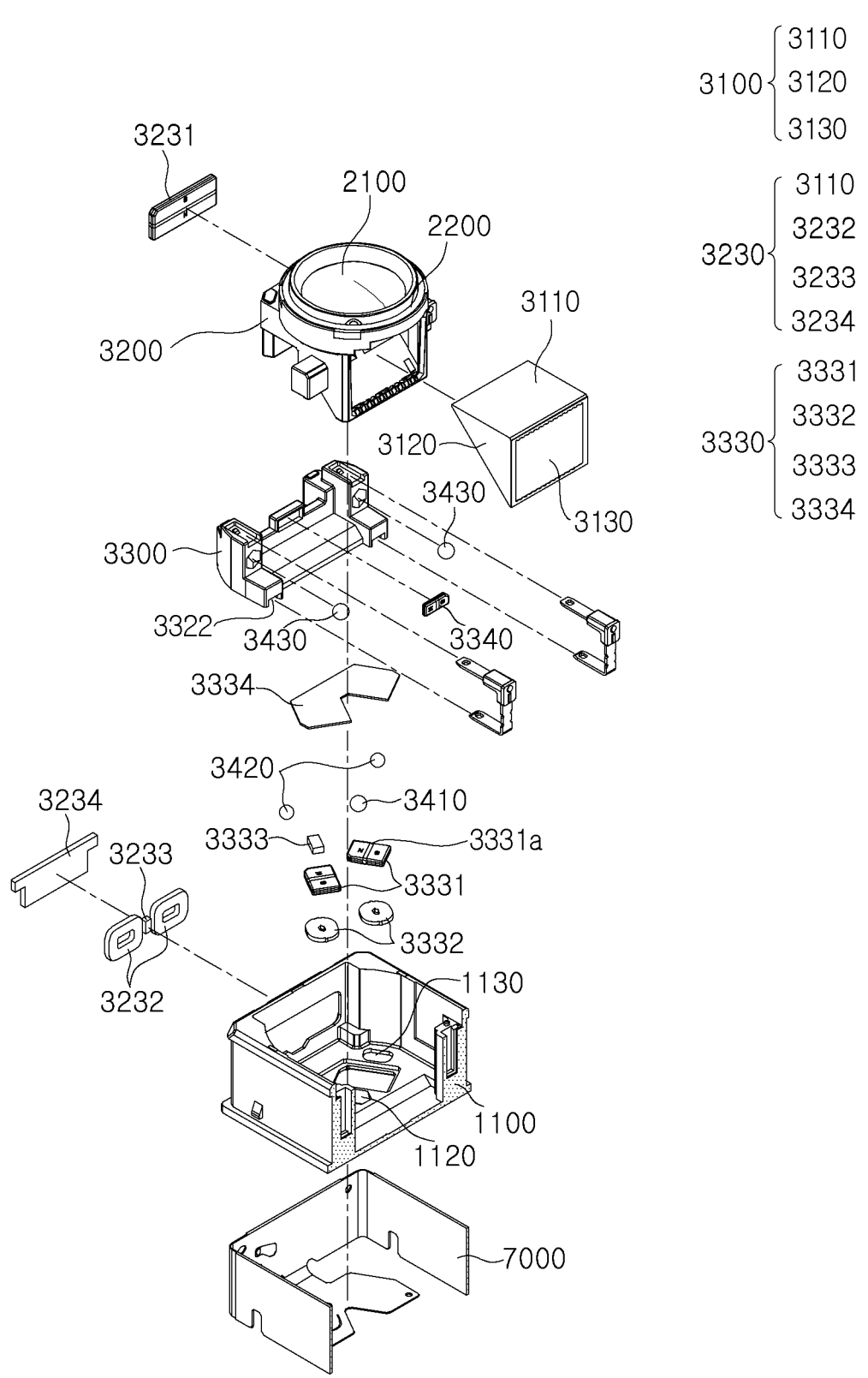
FIG. 8 illustrates an exploded perspective view of a manner which a first lens module and a reflection module are coupled to a housing, in accordance with one or more embodiments.
Figure 9:
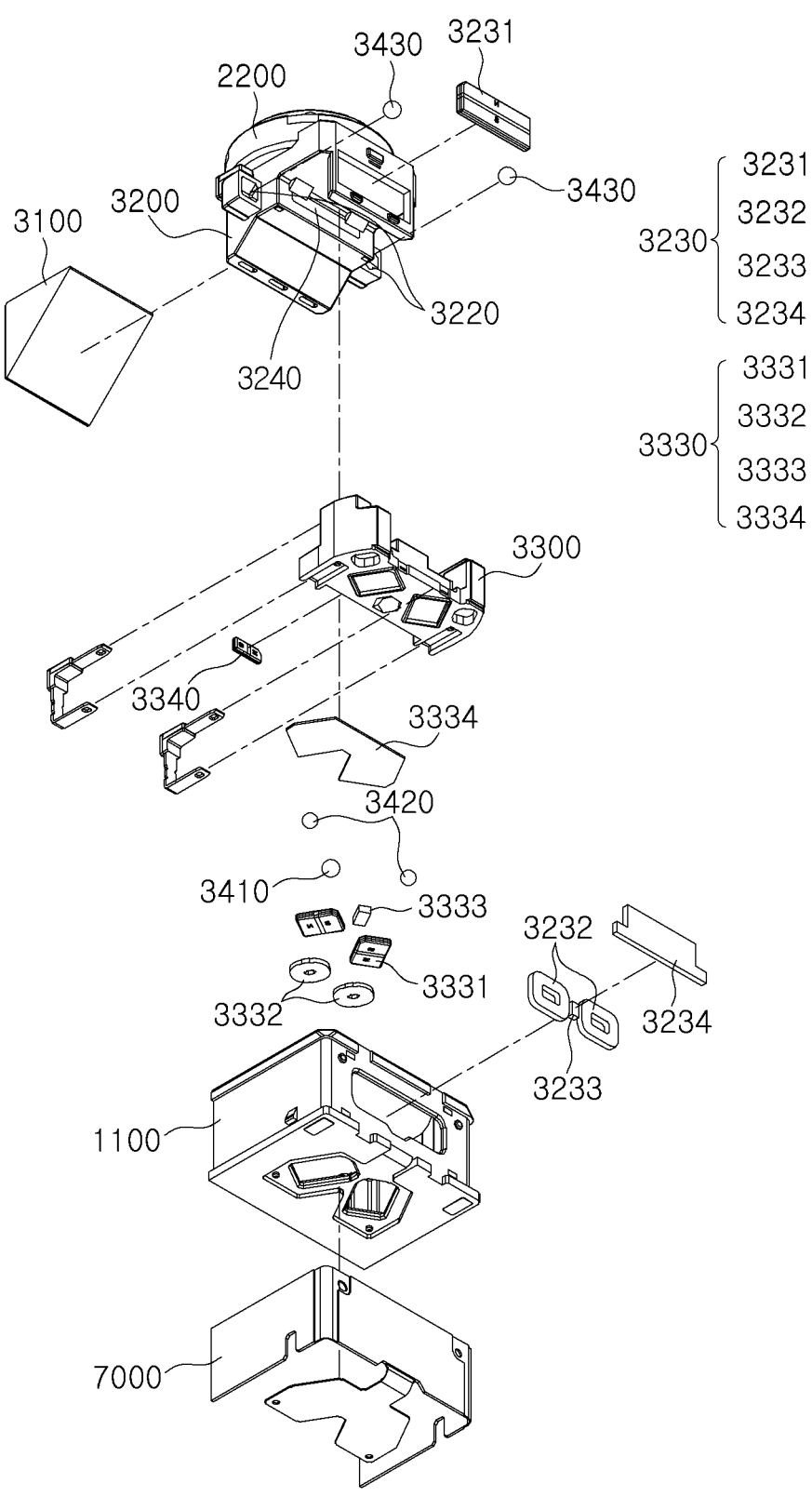
FIG. 9 illustrates an exploded perspective view of a bottom surface of a first lens module and a reflection module according to an embodiment.
Figure 10:
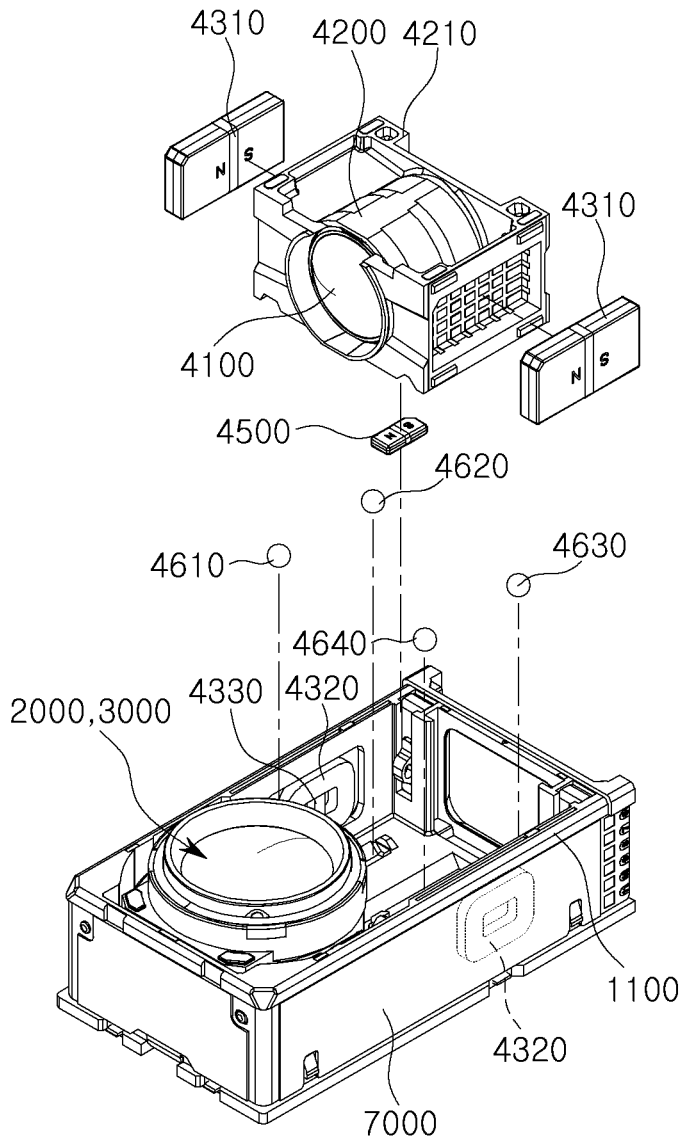
FIG. 10 and FIG. 11 are exploded perspective views illustrating a manner which a second lens module is coupled to a housing, in accordance with one or more embodiments.

Hereinafter, the reflection module 3000 included in the camera module 100 of the present embodiment will be described in detail with reference to FIGS. 7 to 9. FIG. 7 is a perspective view illustrating an example in which the reflection module 3000 is accommodated in the housing 1100. FIG. 8 is an exploded perspective view of the reflection module 3000. FIG. 9 is an exploded perspective view of a rotating holder 3300 and the reflective holder 3200. The reflection module 3000 and the camera module 100 including the same described with reference to FIGS. 7 to 11 correspond to the reflection module 3000 and the camera module 100 previously described in FIGS. 1 to 6, and thus, overlapping descriptions may be omitted.

Referring to FIG. 7, the reflection module 3000 may be accommodated inside the housing 1100, and may include the reflective member 3100 that is configured to change a path of light. The reflective member 3100 may include an incident surface 3110 through which light may be incident from the first lens module 2000 and an exit surface 3120 through which light may be emitted.

The reflective member 3100 may be configured to be movable inside the housing 1100. For example, the reflective member 3100 may rotate about two different rotation axes. One is an axis (Z axis in the drawing) parallel to the first optical axis L1, and the other may be an axis (X axis in the drawing) perpendicular to both the first optical axis (L1, Z axis in the drawing) and the second optical axis (L2, Y axis in the drawing). In an example in which the reflective member 3100 collides with other structures of the camera module 100 (e.g., an inner wall of the housing 1100 or a shield can) while rotating in various directions, there is a fear that the reflective member 3100 may be damaged by impacts, and there is a fear that noise due to an irregular impact sound may be generated.

To prevent this, the reflection module 3000 may include dampers 3510 and 3520 (FIG. 6) that protrude in various directions. The dampers 3510 and 3520 may include a material that is configured to absorb impact energy, and accordingly, shock or noise generated when the reflection module 3000 collides with the inner wall of the housing 1100 may be reduced.

Referring to FIGS. 8 and 9, the reflection module 3000 may include a reflective member 3100 that is configured to change a path of light, a reflective holder 3200 and the rotating holder 3300 movably supporting the reflective member 3100.

The reflective member 3100 may change the path of light by refracting or reflecting incident light.

The reflective member 3100 may include an incident surface 3110 through which light is incident, a reflective surface 3120 through which light is reflected, and an exit surface 3130 through which reflected light is emitted. For example, light incident to the incident surface 3110 in a first direction (Z-axis direction) may be reflected from the reflective surface 3120 and emitted in a second direction (Y-axis direction) through the exit surface 3130. In this example, the first direction (Z-axis direction) may be a direction substantially parallel to the first optical axis L1 of the first lens module 2000, and the second direction (Y-axis direction)

may be a direction substantially parallel to the second optical axis L2 of the second lens module 4000.

The reflective member 3100 may include a light blocking portion to reduce flare by blocking unnecessary light. In an example, although not illustrated, a light blocking portion to block unnecessary light may be disposed at an edge of the incident surface 3110 of the reflective member 3100. However, the location of the light blocking portion is not limited to the illustration, and may be disposed on the exit surface. Additionally, although not illustrated in the drawings, separately from the light blocking portion, a light blocking member that is spaced apart from the reflective member 3100 and may perform a role similar to that of the light blocking portion may be disposed. In an example, the light blocking member may be a baffle disposed between the reflective member 3100 and the lens modules 2000 and 4000.

In an example, the reflective member 3100 may be provided in the reflective holder 3200. The reflective holder 3200 supports the reflective member 3100 and may rotate or move. In an example, the reflective holder 3200 may rotate about a second rotation axis passing through at least two ball members 3430, and accordingly, the reflective member 3100 provided on the reflective holder 3200 may also rotate.

The reflection module 3000 may further include the rotating holder 3300 that movably or rotatably supports the reflective holder 3200. The rotating holder 3300 may be configured to rotatably support the reflective holder 3200, and to rotate or move with respect to the housing 1100. In an example, the reflective holder 3200 may be rotatably supported by the rotating holder 3300 with at least two ball members 3430 interposed therebetween forming rotation axes. Additionally, the rotating holder 3300 may be supported on the housing 1100 with at least one ball member 3410 therebetween, and accordingly, may rotate with respect to the housing 1100 around another rotation axis formed by the at least one ball member 3410. To distinguish respective rotation axes, in the following description, the rotation axis of the rotating holder 3300 is referred to as the first rotation axis and the rotation axis of the reflective holder 3200 is referred to as the second rotation axis.

In the reflection module 3000, in accordance with one or more embodiments, the first rotation axis and the second rotation axis may be different from each other. For example, the first rotation axis and the second rotation axis may be substantially perpendicular.

In an example, the first rotation axis may pass through the incident surface 3110 and the reflective surface 3120 of the reflective member 3100. The second rotation axis may be substantially parallel to the reflective surface 3120 of the reflective member 3100. For example, the second rotation axis may be disposed on the reflective surface 3120 or may be disposed to be parallel to the reflective surface 3120 at a predetermined interval.

In the reflection module 3000, the first rotation axis and the second rotation axis may be configured to meet each other at one point. In this example, the point where the first rotation axis and the second rotation axis meet may be disposed on the reflective surface 3120 of the reflective member 3100, or may be disposed adjacent to the reflective surface 3120.

When the reflection module 3000 is in a neutral position, the incident surface 3110 of the reflective member 3100 is substantially perpendicular to the first optical axis L1 of the first lens module 2000, and the exit surface 3130 of the reflective member 3100 may be substantially perpendicular to the second optical axis L2 of the second lens module 4000. In this example, the first rotation of the reflection module 3000 may substantially coincide with the first optical axis L1, and the second rotation axis of the reflection module 3000 may be perpendicular to both the first optical axis L1 and the second optical axis L2. Also, like the intersection of the first and second rotation axes, the intersection of the first optical axis L1 and the second optical axis L2 may be located on the reflective surface 3130 of the reflective member 3100.

Even if the camera module 100 is shaken by an external force and light is incident in a direction that is offset from the first optical axis L1, the traveling direction of the light may be changed to be substantially parallel to the second optical axis L2 by properly rotating the reflective member 3100.

The reflection module 3000 may further include a support member that supports the reflective holder 3200 to the rotating holder 3300. In an example, the support member may be comprised of a pair of magnetic bodies 3240 and 3340 that are disposed to face each other and act magnetically, and the reflective holder 3200 may be supported on the rotating holder 3300 by the magnetic attraction generated by the pair of magnetic bodies 3240 and 3340.

The pair of magnetic bodies 3240 and 3340 may be separately disposed in the reflective holder 3200 and the rotating holder 3300, respectively. In an example, as illustrated in FIGS. 7 to 9, a pair of magnetic bodies 3240 and 3340 may be comprised of a pulling yoke 3230 disposed on the reflective holder 3200 and a pulling magnet 3340 disposed on the rotating holder 3300. In this example, the pulling magnet 3340 and the pulling yoke 3240 generate magnetic attraction by pulling each other, and based on this magnetic attraction, the reflective holder 3200 may be supported on the rotating holder 3300 with the ball member 3430 therebetween.

However, the configuration of the pair of magnetic bodies 3240 and 3340 is not limited to the above. For example, the pulling magnet 3340 and the pulling yoke 3240 may be disposed on the reflective holder 3200 and the rotating holder 3300, respectively. Alternatively, the pair of magnetic bodies 3240 and 3340 may both be comprised of magnets.

The support member is not limited to the configuration of the above-described magnetic bodies 3240 and 3340, and may be comprised of any configurations as long as it may enable the reflective holder 3200 to be movably supported on the rotating holder 3300.

In example embodiments, the reflection module 3000 may include driving units 3230 and 3330 that drive the reflective holder 3200 and the rotating holder 3300. In an example, as illustrated in FIG. 8, the reflection module 3000 may include a first driving unit 3330 that drives the rotating holder 3300 and a second driving unit 3230 that drives the reflective holder 3200.

The first driving unit 3330 and the second driving unit 3230 may each include a driving coil and a driving magnet. In an example, the first driving unit 3330 may rotate the rotating holder 3300 by electromagnetic interaction between the first driving coil 3332 and the first driving magnet 3331 facing each other. Additionally, the second driving unit 3230 may rotate the reflective holder 3200 based on an electromagnetic interaction between the second driving coil 3232 and the second driving magnet 3231 facing each other.

In the camera module, a driving magnet and a driving coil may be disposed on two components that move relative to each other. In an example, the first driving magnet 3331 may be disposed on the rotating holder 3300, and the first driving coil 3332 may be disposed on the housing 1100. The second driving magnet 3231 may be disposed on the reflective holder 3200, and the second driving coil 3232 may be disposed on the housing 1100.

The driving units 3230 and 3330 may include position sensors 3233 and 3333 that are configured to detect a movement amount of the driving magnets 3231 and 3331, respectively. In an example, the first driving unit 3330 may include a first position sensor 3333 that faces the first driving magnet 3331. The first position sensor 3333 may be disposed around the first driving coil 3332 side by side, or may be disposed inside the first driving coil 3332. Similarly, the second driving unit 3230 may include a second position sensor 3233 that faces the second driving magnet 3231. The second position sensor 3233 may be disposed around the second driving coil 3232 side by side, or may be disposed inside the second driving coil 3232.

In the neutral position of the reflection module 3000, the position sensors 3233 and 3333 may be positioned to face the neutral regions 3231*a* and 3331*a* of the driving magnets 3231 and 3331, respectively. In this example, the neutral regions 3231*a* and 3331*a* of the driving magnets 3231 and 3331 may refer to boundary regions between two different polarities (e.g., N pole and S pole).

The reflection module 3000 may further include a first yoke 3334 and a second yoke 3234 which respectively face the driving magnets 3231 and 3331. In an example, as illustrated in FIG. 8, the first yoke 3334 may be disposed on the rear surface of the first driving coil 3332 facing the first driving magnet 3331. The second yoke 3234 may be disposed on a rear surface of the second driving coil 3232 facing the second driving magnet 3231. The first yoke 3334 and the second yoke 3234 may focus magnetic flux of the driving magnet.

However, the configuration of the driving units 3230 and 3330 of the reflection module 3000 is not limited to the above, and any configuration may be used as long as the reflective holder 3200 and the rotating holder 3300 may be moved.

Hereinafter, the rotating holder 3300 included in the reflection module 3000 will be described in more detail.

The reflection module 3000 may include the rotating holder 3300 that is rotatable with respect to the housing 1100. The rotating holder 3300 may rotate with respect to housing 1100 while rotatably supporting the reflective holder 3200 and the reflective member 3100. In an example, the rotating holder 3300 is rotatably disposed about a first rotation axis, and accordingly, the reflective member 3100 may also rotate along with the rotating holder 3300 around the first rotation axis.

A plurality of ball members 3410 and 3420, which rotatably support the rotating holder 3300, may be disposed between the rotating holder 3300 and the housing 1100.

The plurality of ball members 3410 and 3420 may include a first ball member 3410 forming a rotation axis of the rotating holder 3300, and a guide ball member 3420 that helps stable rotation of the rotating holder 3300.

The first ball member 3410 may form a first rotation axis while rotating in place, while being fixed to the housing 1100. Accordingly, the first rotation axis may pass through the first ball member 3410.

The first rotation axis may substantially coincide with the first optical axis L1 of the first lens module 2000 facing the reflection module 3000. Accordingly, a virtual line extending along the first optical axis L1 may pass through the first ball member 3410.

The first ball member 3410 may be accommodated in a first accommodating groove 1120 of the housing 1100. To fix the position of the first ball member 3410, the first accommodating groove 1120 may be configured to support the first ball member 3410 in at least three points. In an example, the first accommodating groove 1120 may be a groove having at least three inclined surfaces, and the first ball member 3410 may be supported by being in point contact with respective inclined surfaces. Accordingly, the first ball member 3410 may be supported by the first accommodating groove 1120 in at least three points. Additionally, a groove 3321 facing the first accommodating groove 1120 and having the same shape thereas, may also be disposed on the rotating holder 3300. Accordingly, the first ball member 3410 may form a first rotation axis while being rotated in place while being sandwiched between the rotating holder 3300 and the housing 1100.

As the guide ball member 3420, one or more guide ball members 3420 may be disposed. In an example, as illustrated in FIGS. 8 and 9, the reflection module 3000 may include two guide ball members 3420 spaced apart from the first ball member 3410. The guide ball member 3420 may roll with respect to the housing 1100 or the rotating holder 3300, and the rotating holder 3300 may be supported to rotate while maintaining a predetermined distance from the bottom surface of the housing 1100.

The guide ball member 3420 may be accommodated in the guide groove 1130 of the housing 1100. The guide ball member 3420 may be supported by two points or one point in the guide groove 1130. The guide ball member 3420 may be movable along the guide groove 1130. The guide groove 1130 may be disposed to extend in a circumferential direction of the first rotation axis. Alternatively, the guide groove 1130 may be disposed to extend in a tangential direction of a circumference centered on the first rotation axis.

On the other hand, another guide groove 3322 accommodating the guide ball member 3420 may also be disposed on the lower surface of the rotating holder 3300. Accordingly, the guide ball member 3420 may support the rotating holder 3300 while rolling while being sandwiched between the guide groove 3322 of the rotating holder 3300 and the guide groove 1130 of the housing 1100.

A driving force to rotate the rotating holder 3300 may be generated by the first driving unit 3330. In an example, the first driving unit 3330 may include a first driving magnet 3331, a first driving coil 3332, and a first yoke 3334, which may be separately disposed in the rotating holder 3300 and the housing 1100. The driving force may be generated by an electromagnetic interaction between the first driving magnet 3331 and the first driving coil 3332.

The first driving magnet 3331 and the first driving coil 3332 may face each other in a first direction (Z-axis direction). In this example, the first direction (Z-axis direction) may be a direction substantially parallel to the first rotation axis that is the rotation axis of the rotating holder 3300.

The first driving coil 3332 may be disposed on the bottom surface of the housing 1100. In the example of the first driving coil 3332, a plurality of first driving coils 3332 may be spaced apart from each other in the circumferential direction of the first rotation axis, or may be configured as an integral coil having a portion that extends in the circumferential direction of the first rotation axis. The first driving coil 3332 may be disposed between the first ball member 3410 and the guide ball member 3420.

The first driving magnet 3331 may be disposed to face the first driving coil 3332, on the lower surface of the rotating holder 3300. The first driving magnet 3331 may be configured such that different polarities are sequentially magnetized in the rotational direction of the rotating holder 3300. In an example, a surface of the first driving magnet 3331 facing the first driving coil 3332 may be configured to sequentially have an N pole, a neutral region, and an S pole in the rotational direction of the rotating holder 3300.

The first driving unit 3330 may include a first position sensor 3333 that detects the position of the first driving magnet 3331. The first position sensor 3333 may be a magnetic sensor that is disposed inside or outside the first driving coil 3332. In an example, the first position sensor 3333 may include a hall sensor. The first position sensor 3333 may detect a movement amount of the first driving magnet 3331 by detecting a change in magnetic flux passing through the first position sensor 3333.

When the rotating holder 3300 is in a neutral position, the first position sensor 3333 may be disposed to face the neutral region 3331a of the first driving magnet 3331. For example, the first position sensor 3333 may be disposed to face the boundary region between the N pole and the S pole of the first driving magnet 3331, such that the displacement of the first driving magnet 3331 may be effectively sensed.

The first position sensor 3333 may be provided as a plurality of first position sensors, and a change in position of the first driving magnet 3331 may be detected more precisely by comparing signals detected by respective first position sensors 3333 with each other.

The first driving unit 3330 may include a first yoke 3334 facing the first driving magnet 3331. In an example, the first yoke 3334 may be disposed to face the first driving magnet 3331 in the first direction, on the rear surface of the first coil.

The first yoke 3334 may be formed of a magnetic body. Accordingly, the first yoke 3334 may focus the lines of magnetic force generated by the first driving magnet 3331, and at the same time, may generate magnetic attraction by interacting with the first driving magnet 3331. Hereinafter, the magnetic force generated between the first driving magnet 3331 and the first yoke 3334 is defined as the first magnetic force.

Since the first yoke 3334 and the first driving magnet 3331 face each other in the first direction (Z-axis direction), the first yoke 3334 may attract the first driving magnet 3331 in a first direction (Z-axis direction). In an example, the first yoke 3334 may operate as a pulling yoke. The rotating holder 3300 may be supported on the housing 1100 in the first direction (Z-axis direction) based on the first magnetic force between the first yoke 3334 and the first driving magnet 3331.

However, the support structure of the rotating holder 3300 is not limited to the above. In an example, in another embodiment, the reflection module 3000 may further include a separate magnetic material (not illustrated) that generates a magnetic attraction or a magnetic repulsion together with the first yoke 3334 to support the rotating holder 3300.

The reflection module 3000 may include a reflective holder 3200 that is rotatable relative to the rotating holder 3300. The reflective member 3100 may be fixed to the reflective holder 3200, and may rotate with respect to the rotating holder 3300. For example, the reflective holder 3200 may be rotatably disposed about a second rotation axis R2 substantially perpendicular to the first rotation axis R1, and accordingly, the reflective member 3100 may also rotate along with the rotating holder 3300 about the second rotation axis R2.

A plurality of ball members 3430 that guide a rotation of the reflective holder 3200, may be disposed between the reflective holder 3200 and the rotating holder 3300. In an example, as illustrated in FIG. 8, a plurality of second ball members 3430 that form the second rotation axis R2 that is a rotation axis of the reflective holder 3200 may be disposed between the reflective holder 3200 and the rotating holder 3300.

The plurality of second ball members 3430 may be spaced apart from each other in a direction perpendicular to the first rotation axis R1.

The plurality of second ball members 3430 may be spaced apart from each other in a direction perpendicular to both the first optical axis L1 of the first lens module 2000 and the second optical axis L2 of the second lens module 4000.

The plurality of second ball members 3430 may form the second rotation axis R2 while rotating in place while the positions thereof are fixed with respect to the reflective holder 3200 or the rotating holder 3300. The second rotation axis R2 may pass through the plurality of second ball members 3430.

The reflective member 3100 may be disposed between the second ball members 3430. In this example, a plane extending from the reflective surface 3130 of the reflective member 3100 may pass through the second ball member 3430. However, the arrangement of the reflective member 3100 is not limited to the above. In an example, the reflective member 3100 may be disposed such that the reflective surface 3120 faces at least one of the second ball members 3430.

The rotating holder 3300 or the reflective holder 3200 may include accommodating grooves 3220 and 3310 in which the second ball members 3430 may be accommodated. For example, the rotating holder 3300 may include a second accommodating groove 3310 disposed on a surface facing the reflective holder 3200 and receiving a portion of the second ball member 3430, and the reflective holder 3200 may include a third accommodation groove 3220 disposed on a surface facing the rotating holder 3300 and accommodating another portion of the second ball member 3430. The second accommodating groove 3310 of the rotating holder 3300 and the third accommodating groove 3220 of the reflective holder 3200 may face each other in the second direction (Y-axis direction). Corresponding to the number of second ball members 3430, the second accommodating groove 3310 and the third accommodating groove 3220 may be provided as a plurality of accommodating grooves, respectively.

In the one or more examples, to accurately align the relative positions of the reflective holder 3200 and the rotating holder 3300, at least one of the plurality of second accommodating grooves 3310 and the plurality of third accommodating grooves 3220 may be configured to support the second ball member 3430 at at least three points. For example, at least one of the plurality of second accommodating grooves 3310 may be a groove having at least three inclined surfaces, and another one thereof may be a groove having at least two inclined surfaces. The second ball member 3430 may be supported by point contact on each inclined surface. Accordingly, the second ball member 3430 may be supported by at least three points in the second accommodating groove 3310 having three inclined surfaces, and may be supported by two points in the second accommodating groove 3310 having two inclined surfaces. According to this support structure, the second ball member 3430 may have a degree of freedom in one direction in any one of the plurality of second accommodating grooves 3310, and thus, defects due to tolerance may be prevented.

A driving force to rotate the reflective holder 3200 may be generated by the second driving unit 3230. For example, the second driving unit 3230 may include a second driving magnet 3231 disposed on one of the reflective holder 3200 and the housing 1100, and a second driving coil 3232 disposed on the other. The driving force may be generated by an electromagnetic interaction between the second driving magnet 3231 and the second driving coil 3232. However, the arrangement of the second driving magnet 3231 and the second driving coil 3232 is not limited to the above. In an example, the second driving magnet 3231 may be disposed in the housing 1100 and the second driving coil 3232 may be disposed in the reflective holder 3200. Alternatively, the second driving magnet 3231 may be disposed in the reflective holder 3200 and the second driving coil 3232 may be disposed in the rotating holder 3300.

The second driving magnet 3231 and the second driving coil 3232 may face each other in the second direction (Y-axis direction). In this example, the second direction (Y-axis direction) may be substantially parallel to the second optical axis L2 that is the optical axis of the second lens module 4000. Alternatively, the second direction (Y-axis direction) may be substantially perpendicular to the first rotation axis R1 that is the rotation axis of the rotating holder 3300.

Different polarities of the second driving magnet 3231 may be sequentially magnetized in the rotation direction of the reflective holder 3200. In an example, the second driving magnet 3231 may be sequentially magnetized to have an N pole, a neutral region, and an S pole in the rotational direction of the reflective holder 3200.

The second driving coil 3232 may be disposed to face the second driving magnet 3231, on the sidewall of the housing 1100. A second yoke 3234 may be disposed on the rear surface of the second driving coil 3232, such that the lines of magnetic force generated by the second driving magnet 3231 may more intensively pass through the second driving coil 3232. The second yoke 3234 may be formed of a magnetic material, and may focus lines of magnetic force generated by the second driving magnet 3231.

The second driving unit 3230 may include a second position sensor 3233 that senses the position of the second driving magnet 3231. In an example, the reflection module 3000 may include the second position sensor 3233 disposed inside or outside the second driving coil 3232 and configured to face the second driving magnet 3231.

The second position sensor 3233 may be a magnetic sensor. In an example, the second position sensor 3233 may include a hall sensor. The second position sensor 3233 may detect a movement amount of the second driving magnet 3231 by detecting a change in magnetic flux. When the reflective holder 3200 is in a neutral position, the second position sensor 3233 may be disposed to face the neutral region 3231a of the second driving magnet 3231. In an example, the second position sensor 3233 may be disposed to face the boundary area between the N pole and the S pole of the second driving magnet 3231, such that the change in magnetic flux may be effectively sensed.

The second position sensor 3233 may be provided as a plurality of position sensors, and may more accurately detect a change in position of the second driving magnet 3231 by comparing signals detected by respective second position sensors 3233 with each other. When the second position sensor 3233 is disposed in plural, at least two second position sensors 3233 may be disposed side by side in a direction perpendicular to the second rotation axis R2.

The reflective holder 3200 may be supported on the rotating holder 3300 by a magnetic force (hereinafter, referred to as a second magnetic force) generated by the pair of magnetic bodies 3240 and 3340. The pair of magnetic bodies 3240 and 3340 may include a first magnetic body

3240 fixed to the reflective holder 3200 and a second magnetic body 3340 that magnetically interacts with the first magnetic body 3240.

In the examples, the first magnetic body 3240 may be a pulling yoke that is disposed on the reflective holder 3200, and the second magnetic body 3340 may be a pulling magnet that is disposed on the rotating holder 3300. Due to the magnetic attraction between the pulling magnet 3340 and the pulling yoke 3230, the reflective holder 3200 may be supported on the rotating holder 3300 with the second ball member 3430 interposed therebetween. In this example, the pulling magnet 3340 may be a separate magnet distinguished from the second driving magnet 3231 of the second driving unit 3230. For example, as illustrated, separately from the second driving magnet 3231 disposed on the reflective holder 3200, the pulling magnet 3340 may be disposed on the rotating holder 3300. In this manner, a more accurate and stable support structure may be formed by separately providing the driving magnet and the pulling magnet.

In the reflection module 3000, the pulling magnet 3340 and the pulling yoke 3240 may be disposed to face each other in the second direction (Y-axis direction). The second direction (Y-axis direction) may be a direction perpendicular to the first direction (Z-axis direction) in which the first driving magnet 3331 and the first driving coil 3332 of the rotating holder 3300 face each other. As the pulling magnet 3340 and the pulling yoke 3240 face each other in the second direction (Y-axis direction), the reflective holder 3200 may be supported on the rotating holder 3300 by the second magnetic force in the second direction (Y-axis direction).

The second driving magnet 3231 and the pulling magnet 3340 may be spaced apart from each other. The second driving magnet 3231 may be disposed between the pulling magnet 3340 and the second driving coil 3232. In an example, the second driving magnet 3231 may be disposed on a portion of an extension 3210 of the reflective holder 3200, facing the housing 1100.

However, the support structure of the reflective holder 3200 is not limited to the above. In an example, in another embodiment, the pulling magnet 3340 and the pulling yoke 3240 face each other in the second direction (Y-axis direction), and the second driving magnet 3231 may be disposed on a side surface of the reflective holder 3200 to face the second driving coil 3232 disposed on the housing 1100 in a third direction (X-axis direction). In this example, the third direction (X-axis direction) may be a direction perpendicular to both the first direction (Z-axis direction) and the second direction (Y-axis direction). Additionally, the third direction (X-axis direction) may be substantially parallel to the second rotation axis R2 of the reflective holder 3200.

As the reflective member 3100, the reflective holder 3200, or the rotating holder 3300 included in the reflection module 3000 moves, there is a risk of colliding with other members adjacent to the reflection module 3000, for example, the first lens module 2000 and the second lens module 4000. Specifically, in the example in which the lenses included in the lens modules 2000 and 4000 and the reflective member 3100 collide with each other, sensitive optical components may be damaged, and thus a structure that prevents such a collision is desirous.

In the one or more examples, the reflection module 3000 may include dampers 3510 and 3520 that are configured to reduce impact energy or noise generated as the reflection module collides with other components of the camera module 100. For example, the reflection module 3000 may include a first damper 3510 and a second damper 3520 that protrude from the reflective holder 3200 in a first direction (Z-axis direction) and a second direction (Y-axis direction), respectively.

With reference to FIGS. 10 to 13, the second lens module 4000 included in the camera module 100 will be described. The second lens module 4000 described with reference to FIGS. 10 to 13 and the camera module 100 including the same correspond to the second lens module 4000 and the camera module 100 previously described in FIGS. 1 to 9, and thus, overlapping descriptions may be omitted.

The camera module 100 may include the second lens module 4000 through which light emitted from the reflection module 3000 passes. The second lens module 4000 may include one or more lenses 4100 disposed along the second optical axis L2. Light emitted from the reflection module 3000 may be refracted by the lens 4100 of the second lens module 4000 and may be incident to the image sensor 5000 behind the second lens module 4000.

The second lens module 4000 of this embodiment may include one or more lenses 4100, a second lens holder 4200 supporting the lens 4100, and a third driving unit 4300 generating driving force configured to move the second lens holder 4200 relative to the housing 1100. The lens 4100 of the second lens module 4000 may move in a direction parallel to the second optical axis L2 by the third driving unit 4300. However, the configuration of the second lens module 4000 is not limited to that illustrated in the drawing. For example, the second lens module 4000 may include a plurality of sub-lens modules each containing one or more lenses. The sub-lens modules may be configured to be movable independently of each other in a direction parallel to the second optical axis L2.

The second driving unit 3230 may include a third driving magnet 4310 and a third driving coil 4320 facing each other, and a third position sensor 4330 that detects a movement amount of the second driving magnet 3231.

The third driving magnet 4310 may be disposed in the second lens holder 4200 of the second lens module 4000, and the third driving coil 4320 may be disposed in the housing 1100. The third driving coil 4320 and the third driving magnet 4310 may face each other in a direction perpendicular to the second optical axis L2. Due to the electromagnetic interaction between the third driving coil 4320 and the third driving magnet 4310, the second lens holder 4200 may move in a direction parallel to the second optical axis L2.

A surface of the third driving magnet 4310, facing the third driving coil 4320, may be configured such that different polarities are sequentially magnetized in the moving direction of the second lens module 4000.

The third position sensor 4330 may be disposed inside or outside the third driving coil 4320 to face the third driving coil 4320. The third position sensor 4330 may be a magnetic sensor. In an example, the third position sensor 4330 may include a hall sensor.

Figure 12:
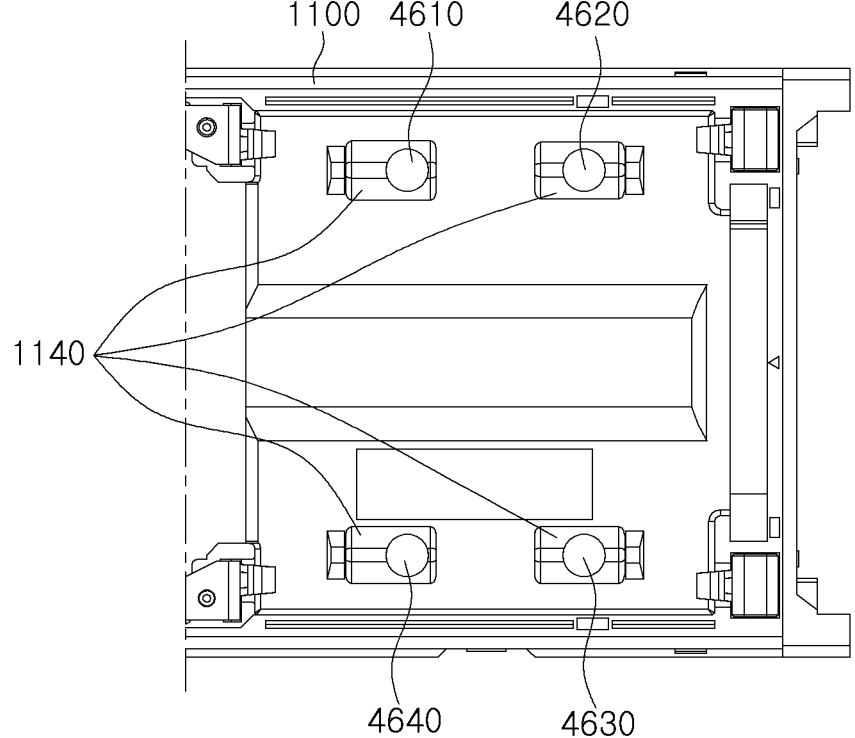
FIG. 12 illustrates a plan view of a portion to which a second lens module is coupled in a housing, in accordance with one or more embodiments.
Figure 13:
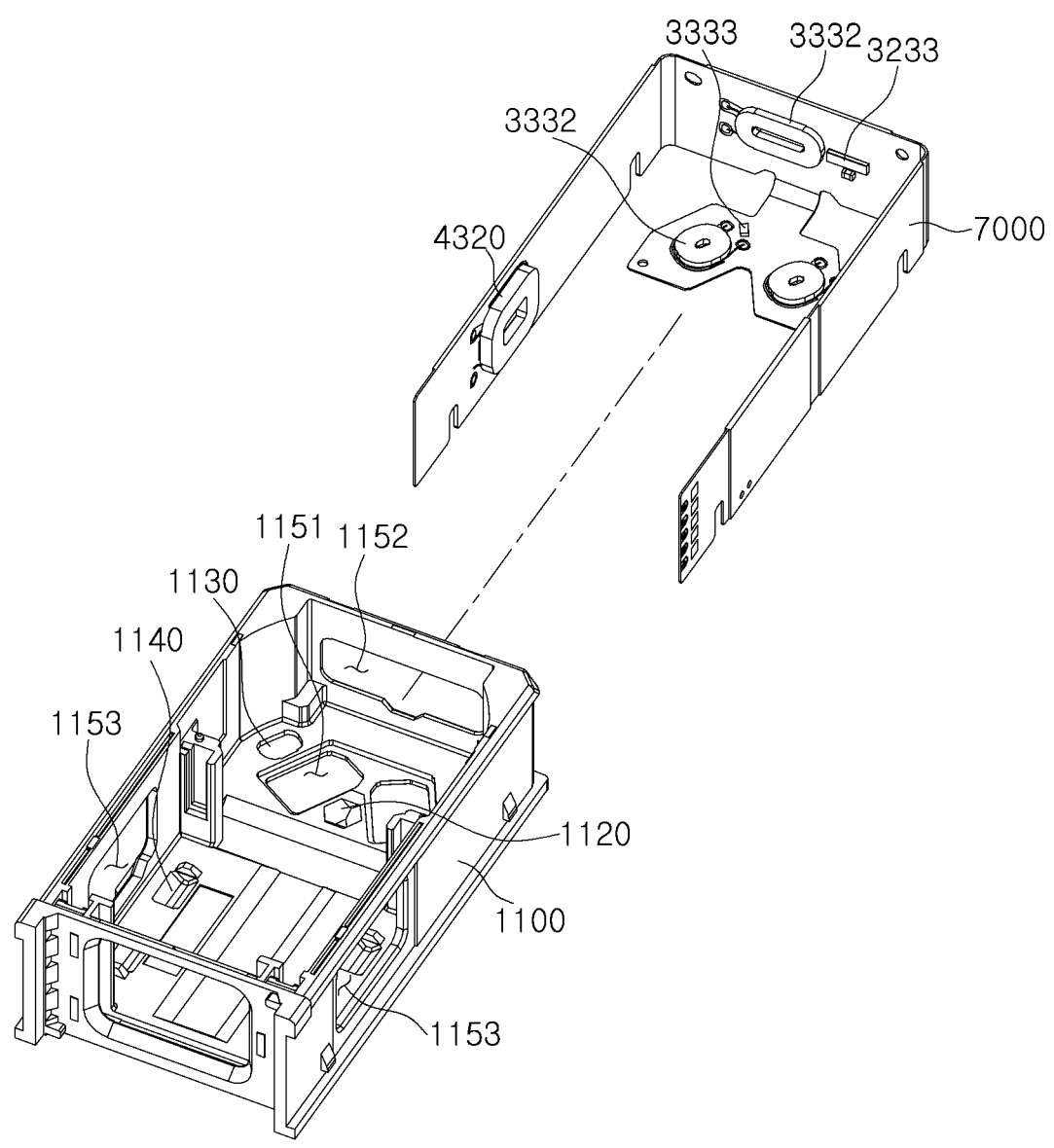
FIG. 13 illustrates an exploded perspective view of a coupling of a housing and a circuit board, in accordance with one or more embodiments.

The third position sensor 4330 may be provided as a plurality of third position sensors. In an example, as illustrated in FIG. 12, the plurality of third position sensors 4330 may be disposed side by side in the moving direction of the second lens module 4000. According to this position sensor arrangement structure, even in an example in which the third driving magnet 4310 moves within the housing 1100 with a long stroke range, the position of the third driving magnet 4310 may be accurately sensed.

The second lens module 4000 may include a plurality of ball members 4600 disposed between the second lens holder 4200 and the housing 1100. For example, as illustrated, three or four ball members (4610, 4620, 4630 and 4640, any one of which may be omitted) may be disposed between the second lens holder 4200 and the housing 1100, and accordingly, the second lens holder 4200 may move smoothly inside the housing 1100.

The plurality of ball members 4600 may include a third ball member 4610, a fourth ball member 4620, and a fifth ball member 4630 that are spaced apart from each other. The plurality of ball members 4600 may roll along a guide groove 4230 of the second lens holder 4200 or a guide groove 1140 on the lower surface of the housing 1100.

The second lens module 4000 may further include a light blocking member 4400 to prevent flare. In an example, the light blocking member 4400 may be a frame-shaped member disposed on a surface of the second lens holder 4200, facing the image sensor 5000, and may prevent a flare phenomenon by blocking unnecessary scattered light among the light passing through the second lens module 4000.

The guide grooves 4230 and 1140 may be disposed on the second lens holder 4200 and the lower surface of the housing 1100, respectively, such that the second lens module 4000 may stably move in the direction of the second optical axis L2.

The guide grooves 4230 and 1140 may extend in the direction of the second optical axis L2, and may be configured such that the plurality of ball members 4600 are accommodated and may be moved by rolling.

The guide grooves 4230 and 1140 may have a V-shaped cross section or a U-shaped cross section, but a detailed cross-sectional shape is not limited thereto.

The second lens holder 4200 may have an extension 4210 that extends backward. To increase the stroke of the second lens module 4000, a portion of the guide grooves 4230 and 1140 may extend to the extension 4210.

The second lens module 4000 may be supported in a direction perpendicular to the second optical axis L2 by magnetic force generated by the pair of magnetic bodies 4510 and 4520.

Figure 11:
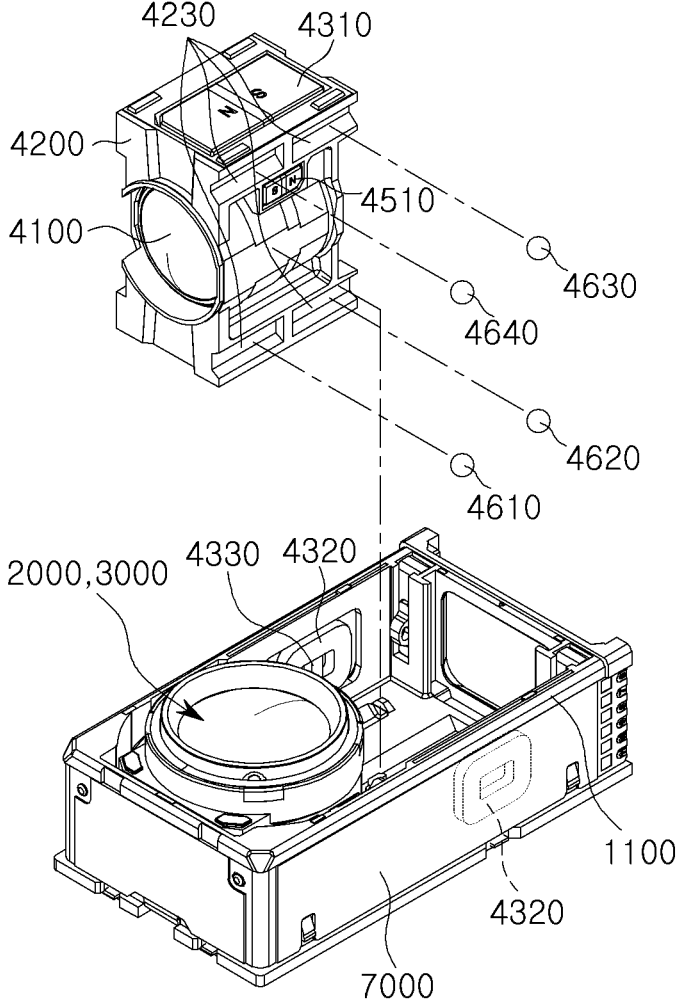

Referring to FIG. 11, a third magnetic body 4510 may be disposed on the lower surface of the second lens holder 4200, and a fourth magnetic body 4520 facing the third magnetic body 4510 may be disposed in the housing 1100. One of the third magnetic body 4510 and the fourth magnetic body 4520 may be a pulling magnet, and the other may be a pulling yoke.

Based on the magnetic attraction (hereinafter referred to as the third magnetic force) generated between the third magnetic body 4510 and the fourth magnetic body 4520, the second lens holder 4200 may move while being in close contact with the bottom surface of the housing 1100 with the plurality of ball members 4600 interposed therebetween.

In the camera module 100, the driving coils 3232, 3332, and 4320, that move the reflective member 3100 and the second lens holder 4200, may be connected to a circuit board 7000, and may be exposed to the inner space of the housing 1100. In an example, referring to FIGS. 9 and 13, the first driving coil 3332, the second driving coil 3232, and the third driving coil 4320 may be disposed on the circuit board 7000 and may be exposed to the inner space of the housing 1100 through openings 1151, 1152, and 1153 of the housing 1100.

The first driving coil 3332, the second driving coil 3232, and the third driving coil 4320 may all be connected to the same circuit board 7000, but are not limited thereto, and for example, may be connected to different circuit boards and exposed to the inner space of the housing 1100.

As set forth above, according to the one or more examples, a camera module having more lens modules without increasing the overall length of the optical system may be provided by disposing lens modules in a front area and a rear area of a reflection module.

In the one or more examples, the example camera module may be disposed in a mobile device.

According to embodiments, a reflection module and a camera module having a structure in which light introduced through a gap between a reflector (reflective member) and a surrounding structure may be significantly blocked may be provided.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A camera module, comprising:
a first lens module comprising at least one lens, and having light incident thereinto;
a second lens module comprising at least one lens; and
a reflection module, configured to rotate around multiple axes, and having a reflective member configured to guide light that has passed through the first lens module to the second lens module, and perform an optical image stabilization operation,
wherein a light blocking member is disposed between the first lens module and the reflection module, and
wherein the first lens module is coupled to the reflection module, and is configured to move together with the reflection module.

2. The camera module of claim 1, wherein the light blocking member has a larger area than an area of the reflective member and a lens disposed in the first lens module, closest to the reflective member.

3. The camera module of claim 1, wherein the light blocking member is a spacer disposed between the reflective member and a lens disposed in the first lens module closest to the reflective member.

4. The camera module of claim 3, wherein the spacer is one of a plastic film and a black coated stainless-steel material.

5. The camera module of claim 1, wherein the light blocking member is fixedly coupled to the reflection module.

6. The camera module of claim 1, wherein the light blocking member is integral with the reflection module.

7. The camera module of claim 1, wherein the light blocking member is fixedly coupled to the first lens module.

8. The camera module of claim 1, wherein the light blocking member is integral with the first lens module.

9. The camera module of claim 1, wherein the light blocking member comprises an opening through which light passes, and at least a portion of an edge of the light blocking member adjacent to the opening has a serrated shape.

10. The camera module of claim 1, wherein the reflection module is configured to be rotatable about a first axis perpendicular to an optical axis of the second lens module and a second axis, perpendicular to both the optical axis and the first axis.

11. An electronic device, comprising the camera module of claim 1.

12. A camera module, comprising:
a first lens module having a first optical axis and a second lens module having a second optical axis different from the first optical axis; and
a reflection module, configured to rotate around multiple axes, and comprising a reflective member configured to guide light that has passed through the first lens module to the second lens module, and disposed between the first lens module and the second lens module,
wherein a light blocking member is disposed between the first lens module and the reflection module,
wherein a relative alignment of the first lens module and the reflection module is maintained to be constant, and
wherein a relative alignment of the second lens module and the reflection module is configured to be changeable.

13. The camera module of claim 12, wherein the first lens module is fixedly coupled to the reflection module.

14. The camera module of claim 12, wherein the light blocking member has a larger area than a surface of the reflective member opposite to the light blocking member.

15. The camera module of claim 12, wherein the light blocking member has a larger area than an area of an effective surface of a lens disposed closest to the reflective member among lenses disposed in the first lens module.

16. The camera module of claim 12, wherein the light blocking member comprises an opening through which light passes, and at least a portion of an edge of the light blocking member adjacent to the opening has a serrated shape.

17. An electronic device including the camera module of claim 12.

18. A camera module, comprising:
a prism;
a light blocking member disposed on a light incident surface of the prism;
a first lens module disposed on a light incident surface of the light blocking member;
a reflection module disposed on the light incident surface of the prism, and configured to rotate around multiple axes, and;
wherein the light blocking member comprises a serrated inner edge, and
wherein the prism is configured to direct light incident on the first lens module to a second lens module.

19. The camera module of claim 18, wherein the first lens module is coupled to the reflection module and is configured to move together with the reflection module.

* * * * *